United States Patent

Hirano et al.

[11] Patent Number: 5,573,860
[45] Date of Patent: Nov. 12, 1996

[54] BIMETAL

[75] Inventors: Kenji Hirano, Suita; Masaaki Tomita, Souraku-gun; Masaaki Ishio, Osaka, all of Japan

[73] Assignee: Sumitomo Special Metals Co., Ltd., Osaka, Japan

[21] Appl. No.: 238,527

[22] Filed: May 5, 1994

[30] Foreign Application Priority Data

Dec. 27, 1993 [JP] Japan .................................. 5-350291

[51] Int. Cl.⁶ ............................................. B32B 15/18
[52] U.S. Cl. ........................ 428/617; 428/616; 428/618; 428/619; 428/681
[58] Field of Search ......................... 428/616, 617, 428/618, 619, 653, 659, 679, 681, 682, 676, 655, 660; 420/95

[56] References Cited

U.S. PATENT DOCUMENTS

| | | | |
|---|---|---|---|
| 1,942,261 | 1/1934 | Scott | 420/95 |
| 2,240,824 | 5/1941 | Alban et al. | 428/617 |
| 2,332,416 | 10/1943 | Waltenberg | 428/619 |
| 3,581,366 | 6/1971 | Gottlieb et al. | 428/416 |
| 3,707,359 | 12/1972 | Hanley | 428/618 |
| 3,767,370 | 10/1973 | Ornstein | 428/618 |
| 4,115,624 | 9/1978 | Izbicki | 428/619 |

FOREIGN PATENT DOCUMENTS

| | | | |
|---|---|---|---|
| 61-235535 | 10/1986 | Japan . | |
| 6-100982 | 4/1994 | Japan . | |
| 1416264 | 12/1975 | United Kingdom | 420/95 |

OTHER PUBLICATIONS

"Expansion Properties of Low–Expansion Fe–Ni–Co Alloys", Trans. AIME, V. 89, 1930, (Inst. of Metals Div.), pp. 508–536.

*Primary Examiner*—John Zimmerman
*Attorney, Agent, or Firm*—Watson Cole Stevens Davis, P.L.L.C.

[57] ABSTRACT

It is an object of the present invention to provide a bimetal having a same or wider proportional temperature range than a bimetal using a 42 wt % Ni—Fe alloy as a low thermal expansion alloy, and a higher bending characteristic of a large bending coefficient than a bimetal using a 36 wt % Ni—Fe alloy. The bimetal is formed by bonding a Ni—Co—Fe group low thermal expansion alloy, wherein a total amount of Ni and Co restricted to a very narrow containing range is within a specific composition range, a thermal expansion coefficient at 30 to 100°C. is made similar to that of a 31 wt % Ni—5 wt % Co—Fe alloy of a nominal composition, a thermal expansion is very small and $2 \times 10^{-6}$/°C. or less in the temperature range of 30° to 300° C., and further, a transition point is 250° C. or higher and a transformation temperature is 50° C. or less, and a high thermal expansion metal or alloy directly or via an intermediate metal or alloy whereby a stable and high precision thermal control can be realized in thermal control devices and the like, and it is possible to achieve the small-size, light and endurable devices, thus the bimetal can be used more widely.

17 Claims, 3 Drawing Sheets

BIMETAL

BACKGROUND OF THE INVENTION

1. Field of the Invention

The present invention relates to bimetals frequently used in thermal control devices and the like, and more particularly to a bimetal which has a high bending characteristic by using Ni—Co—Fe type low thermal expansion alloys consisting of a specific composition range as a low thermal expansion alloy, and is capable of enlarging a proportional temperature range.

2. Description of the Prior Art

In general, a bimetal which is formed by bonding and laminating at least two or more kinds of metal or alloy having different thermal expansion coefficients by a suitable method and rolling into a plate or wire, has a bending characteristic due to temperature changes responsive to the difference in thermal expansion coefficients, and is used in many applications as in thermal control devices and for accomplishing color adjustment of a color television and the like.

As the metal or alloy constituting the bimetal, a Ni—Fe alloy is used as a material having a low thermal expansion coefficient, and as a material having a high thermal expansion coefficient, Ni, a Zn—Cu alloy, Ni—Cr—Fe alloy, Ni—Mn—Fe alloy, Ni—Mo—Fe alloy, Cu—Ni—Mn alloy and the like are used in response to the working temperature ranges.

Also, for adjusting an electrical resistivity of the bimetal responsive to its use, it is known to bond an intermediate metal or alloy layer such as Cu, a Cu alloy, Ni, or the like is between the low thermal expansion alloy an d the high thermal expansion metal or alloy.

Furthermore, when necessary it is known to include a corrosion-resistance coating such as a stainless alloy and the like or a getter material coating such as Al, Zn and the like on the bimetal surface.

As described above, though the conventional bimetal is constituted by bonding the low thermal expansion alloy and the high thermal expansion metal or alloy with or without interposing an intermediate metal or alloy layer therebetween, in any cases an Ni—Fe alloy is used as the low thermal expansion alloy.

A 36 wt % Ni—Fe alloy is known as the most common alloy used in the bimetal as the Ni—Fe alloy (JIS c 2530). However, the 36 wt % Ni—Fe alloy reaches at the transition point at about 200° C. and the thermal expansion becomes considerably large at temperatures above the transition point, it is disadvantageous in that a proportional temperature range as the bimetal is restricted within the range of about 150° C. or less.

A 42 wt % Ni—Fe alloy is known as the Ni—Fe alloy having the higher transition point of thermal expansion than the 36 wt % Ni—Fe alloy.

The thermal expansion transition point of the 42 wt % Ni—Fe alloy is about 350° C., and the proportional temperature range as the bimetal can also be enlarged to about 350° C.

However, since the thermal expansion of the 42 wt % Ni—Fe alloy is substantially fairly large as compared with that of the 36 wt % Ni—Fe alloy (for example, when compared by a mean thermal expansion coefficient in the temperature range of 30 to 100° C., the 42 wt % Ni—Fe alloy about $4 \times 10^{-6}$. $K^{-1}$ and the 36 wt % Ni—Fe alloy is about $1.7 \times 10^{-6}$. $K^{-1}$), it is disadvantageous in that a bending coefficient as the bimetal is small.

As previously described, the bimetal is used very widely, and in recent years the working temperature range has increased for example, in thermal control devices, and a high-precision control in the high temperature region is required, thus a linear bending characteristic in the high temperature region is also required for the bimetal. That is, it is indispensable to enlarge the proportional temperature range.

As thermal control devices and the like are required not only to be smaller and lighter, also to be more durable, it is also desirable for the bimetal to improve its bending coefficient further.

However, in the bimetal proposed at present using the 36 wt % Ni—Fe alloy or 42 wt % Ni—Fe alloy as the low thermal expansion alloy, since it has such disadvantages as described before, the recent demand can not be satisfied.

It is therefore an object of the present invention to provide a bimetal which solves the aforementioned disadvantages and has a similar or larger proportional temperature range than the bimetal using the 42 wt % Ni—Fe alloy as the low thermal expansion alloy, and a higher bending characteristic which is a larger bending coefficient than the bimetal using the 36 wt % Ni—Fe alloy.

SUMMARY OF THE INVENTION

One of the inventors of the present invention has previously proposed a low thermal expansion alloy composed of 31.5 to 34 wt % Ni, 6 to 8.5 wt % Co and wherein 38.5 wt % $\leq$ Ni + Co $\leq$ 40.5 wt % are satisfied, with residual Fe and unavoidable impurity elements as a Ni—Co—Fe type low thermal expansion alloy having a very small thermal expansion coefficient which does not change in a high temperature region (Japanese Patent Application No. Hei 4-278206).

This Ni—Co—Fe type low thermal expansion alloy is characterized in that, by bringing a total amount of Ni and Co respectively restricted to a very narrow containing range within a specific range, the thermal expansion coefficient at 30° C. to 100° C. can be made similar to the thermal expansion coefficient of the conventional 31 wt % Ni-5 wt % Co—Fe alloy of nominal composition so-called a super invar alloy, and furthermore, the thermal expansion low which is $2 \times 10^{-6}/°$ C. or less in the temperature range of 30° to 300° C., still furthermore, a transition point is 250° C. or higher and a transformation temperature is –50° C. or less, in the wide working environmental temperature range from the low to high temperatures, the thermal expansion coefficient is very small and hardly changes, exhibiting a good characteristic.

As the result of repeating various experiments on characteristics in the case of using the Ni—Co—Fe type low thermal expansion alloy consisting of a specific composition range as the low thermal expansion alloy constituting the bimetal, the inventors have found that, it is possible to enlarge the bending characteristic and proportional temperature area in the high temperature region which could not be realized hitherto, and completed the invention.

The bimetal of the present invention is that, by effectively arranging the Fe—Ni—Co type alloy, particularly, wherein the thermal expansion is very small and $2 \times 10^{-6/°}$ C. or less in the temperature range of 30° to 300° C. as the low thermal expansion alloy, and furthermore, wherein the total amount of Ni and Co restricted to a very narrow containing range, where the transition point is 250° C. or higher and the transformation temperature is –50° C. or less, is brought within a specific range, the bending coefficient can be improved and the proportional temperature range can be enlarged, particularly, a linear bending characteristic in the high temperature region is obtained.

That is, as the bending coefficient is improved, the size of bimetal parts is reduced, thus the device using the bimetal can be made smaller and lighter. Electric resistance is about same as the conventional material, thus features as the present resistance material are not spoiled.

Also, enlargement of the proportional temperature range does not only widen use of the bimetal, but also stabilizes the actuation in the high temperature region to realize a high precision control in the thermal control devices.

DETAILED DESCRIPTION OF THE PREFERRED EMBODIMENTS

Figure 1A:
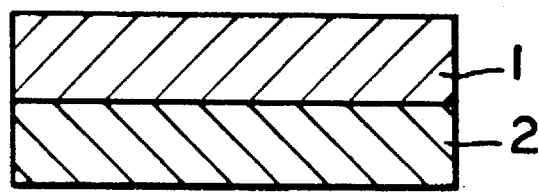
FIGS. 1(A), (B) and (C) are longitudinal sectional explanatory views showing a laminate configuration of a bimetal according to the present invention.

The present invention is directed to a bimetal comprising, a low thermal expansion alloy composed of wherein 31.5 to 34 wt % Ni, 6 to 8.5 wt % Co and 38.5 wt % $\leq$ Ni + Co $\leq$ 40.5 wt % are satisfied, residual Fe and unavoidable impurity elements, and a high thermal expansion metal or alloy, which are bonded together directly or via an intermediate metal or alloy.

A bimetal comprising, a low thermal expansion alloy comprising Ni $\geq$ 31.5 wt %, 7 < Co < 8 wt % and Ni + Co $\leq$ 40.5 wt %, residual Fe and unavoidable impurity elements, is also proposed as a composition to enable further enlargement of a proportional temperature range.

The present invention also proposes a bimetal at least, on one surface of which a foil of either of Ni, Ni—Cu alloy, Fe—Cr alloy, Fe—Ni—Cr alloy and Ti is clad to improve the corrosion resistance, or a bimetal, at least, on one surface of which a foil either Al or Zn is clad.

The reasons why a composition of the low thermal expansion alloy which is a main feature of the bimetal of the present invention are restricted are described in the following.

Ni is a basic component of the group composition, when it is below 31.5 wt %, a $\gamma \rightarrow \alpha'$ transformation temperature becomes $-50°$ C. or higher and there is the possibility that $\gamma \rightarrow \alpha'$ transformation occurs during use or transportation, when the $\gamma \rightarrow \alpha'$ transformation has once occurred, the thermal expansion is suddenly enlarge, and when exceeding 34 wt %, the thermal expansion becomes larger, so that Ni is kept between 31.5 and 34 wt %.

Co is basic component of the composition, when it is below 6 wt %, a transition point of the thermal expansion becomes 250 ° C. or less and the thermal expansion at temperatures exceeding the transition point becomes larger, thus enlargement of the proportional temperature range of the bimetal which is one of the main objects of the present invention can not be realized. Also, since the thermal expansion becomes larger when exceeding 8.5 wt %, Co is kept between 6 to 8.5 wt %.

Restriction on a total amount of Ni and Co is that, when Ni +Co is 38.5 wt % or less, the thermal expansion transition point of below 250° C. and the thermal expansion at temperatures exceeding the transition point becomes larger, thus enlargement of the proportional temperature range of the bimetal which is one of the main objects of the present invention can not be realized. Furthermore, since the thermal expansion increases when exceeding 40.5 wt %, Ni + Co is kept between 38.5 and 40.5 wt %.

Meanwhile, Fe is a basic component of the group composition and occupies a containing residue of Ni, Co and so on.

In the above-mentioned composition range, for raising the thermal expansion transition point and further enlarging the proportional temperature range of the bimetal, it is desirable to bring the composition range of Ni and Co, which are the basic components to Ni $\geq$ 31.5 wt %, 7 < Co < 8 wt % and Ni + Co $\leq$ 40.5 wt %. The thermal expansion transition point in the Ni—Co—Fe type low thermal expansion alloy consisting of this composition range is about 290° C.

Though adhesive elements are not particularly limited, then considering mechanical characteristics of the materials, preferably, C is 0.02 wt % or less, Si is 0.25 wt % or less and Mn is 0.5 wt % or less.

As the high thermal expansion metal or alloy constituting the bimetal of the present invention, various known materials can be applied.

For example, in the configuration using Ni or Cu, a Zn—Cu alloy composed of 20 to 40 wt % Zn and residual Cu as the high thermal expansion metal or alloy, the bimetal which is effective for use at a relatively low temperature (to about 150° C.), and particularly, has such features as a low electric resistance, a high thermal conductivity and a good operating sensitivity is obtained.

In the configuration using the Ni—Cr—Fe alloy, Ni—Mn—Fe alloy and Ni—Mo—Fe alloy composed of 17 to 26 wt % Ni, one kind of 2.5 to 12 wt % Cr, 5 to 7 wt % Mn and 3 to 7 wt % Mo and residual Fe as the high thermal expansion metal alloy, the bimetal having such features as a wide temperature range up to about 300° C. and a high bending characteristic up to 350° C. is obtained.

Furthermore, in the configuration using the Cu—Ni—Mn alloy composed of 70 to 80 wt % Mn, 5 to 15 wt % Ni and residual Cu as the high thermal expansion alloy, the bimetal which is effective as the high resistance bimetal (volume resistivity to about 140 μΩ·cm at 20° C.), particularly, has such features as a high bending characteristic which shows the highest bend in a middle temperature region up to about 220° C., and a large bending amount at the time of heating due to a high electric resistance is obtained.

Figure 1B:
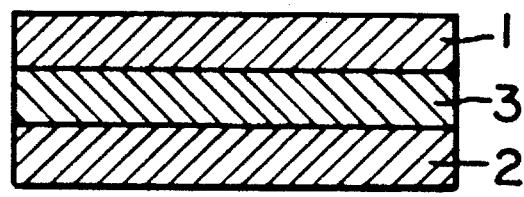

The present invention is that, as shown in FIG. 1 (A), besides the configuration, wherein a Ni—Co—Fe type low thermal expansion alloy plate 1 described hereinbefore and a high thermal expansion material plate 2 composed of a high thermal expansion metal or alloy consisting of various composition ranges are directly bonded together and integrated, for example, as shown in FIG. 1(B), in the configuration, wherein an intermediate layer material plate 3 composed of metals or alloys such as Cu, Cu alloy, Ni, and the like is interposed between and integrated with the low thermal expansion alloy plate 1 and the high thermal expansion material plate 2 to adjust the electrical resistivity of the bimetal, the substantial features of the present invention can be realized effectively.

Figure 1C:
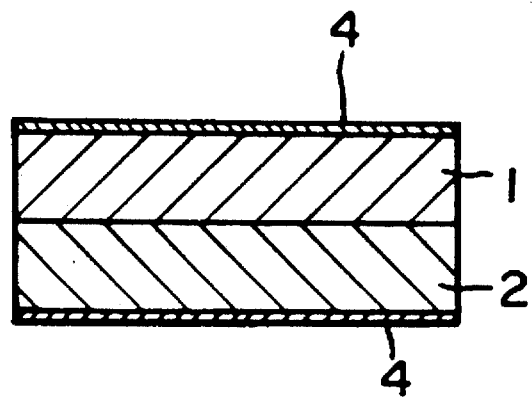

Also, besides the configuration, wherein, as shown in FIG. 1(A), the low thermal expansion alloy plate 1 and the high thermal expansion material plate 2 are directly bonded together and integrated, as shown in FIG. 1(C), by forming coating layers 4,4 having a good corrosion resistance of Ni, Ni—Cu alloy, Fe—Cr alloy, Fe—Ni—Cr alloy. Ti and the like on both surfaces of the low thermal expansion alloy plate 1 and the high thermal expansion material plate 2 which are directly bonded together and integrated, it can be used in an atmosphere exposed to steam such as for use in a steam trap and the like. It is to be understood that, the coating layer 4 may be provided only on one surface of either the low thermal expansion alloy plate 1 or the high thermal expansion material plate 2.

Though the above-mentioned corrosion resistance coating layer 4 is formed on one surface or on both surfaces of the bimetal responsive to the working atmosphere and the material of the bimetal proper, it is desirable to select the material, thickness and so on suitably for realizing the substantial features of the present invention effectively.

Meanwhile, it is also possible to use in a glow starter for fluorescent lamp, by directly together and integrating the low thermal expansion alloy plate 1 and the high thermal expansion material plate 2, and coating a getter material such as Al, Zn and the like on, at least, one surface to form the coating layers 4,4 as same as the configuration shown in FIG. 1(C).

The above-mentioned coating layer 4 may also be provided on one surface or both surfaces of the configuration, wherein, as shown in FIG. 1(B), the intermediate layer material plate 3 is interposed between and integrated with the low thermal expansion alloy plate 1 and the high thermal expansion material plate 2.

That is, in the present invention a main feature is that, the low thermal expansion alloy constituting the bimetal is composed of specific compositions and furthermore, by suitably selecting the high thermal expansion metal or alloy, intermediate metal or alloy and coating metal or alloy, it is possible to provide a bimetal having a good characteristic responsive to various uses.

EMBODIMENTS

Features of a bimetal of the present invention are described according to one embodiment shown in the following. Both the bimetal of the present invention and that of a comparative example are formed into the bimetal having a thickness of 0.5 mm by a known manufacturing method, that is, a low thermal expansion alloy plate, a high thermal expansion alloy plate of a predetermined composition range constituting the bimetal, and furthermore, when necessary, an intermediate metal or alloy layer and a coating metal or alloy foil are subjected to cold rolling at a predetermined rate of rolling, and are passed through such processes as diffusion annealing, finished rolling, trimming and so on.

In the both bimetals, a thickness ratio of the low thermal expansion alloy plate and the high thermal expansion alloy plate was set to 1:1.

Configurations of the bimetals or the kinds of low thermal expansion alloy, coating material, intermediate layer and high thermal expansion alloy, and JIS symbols are shown in Table 1.

A proportional temperature range (high sensitivity temperature range), bending coefficient (based on room temperature to 100° C. and JIS C 2530) and electrical resistivity of the resulting bimetal were measured and the result is shown in Table 2.

Figure 2:
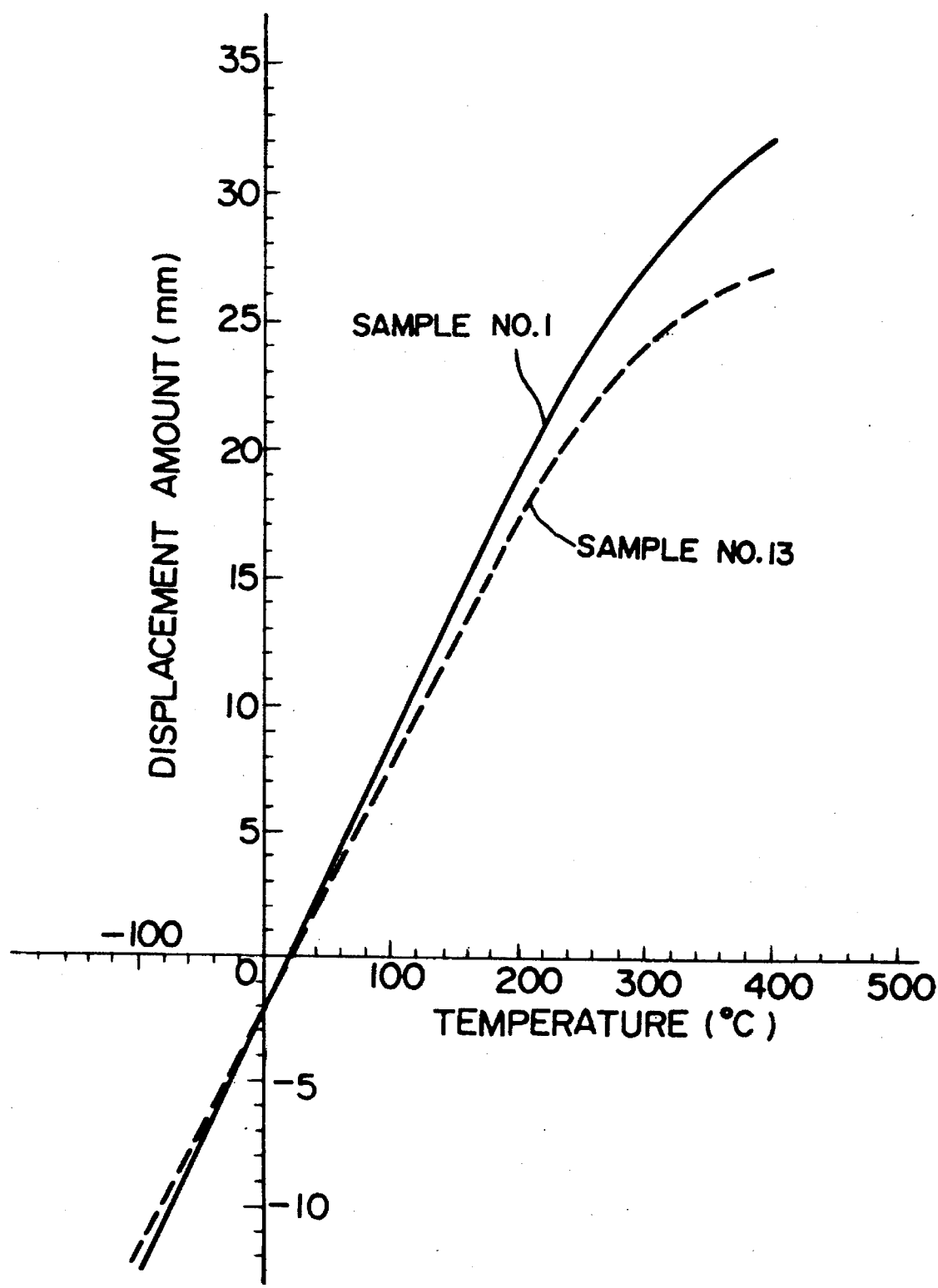
FIG. 2 is a graph showing the relationship between the temperature change and a displacement amount (bending amount) of a bimetal.

The relationship between the temperature change and displacement amount (bending amount) of a Sample No. 13 of the comparative example conventionally known as a bimetal configuration having a large displacement amount (bending amount), and a Sample No. 1 of the present invention (a high thermal expansion alloy is the same material as the Sample No. 13) is shown in FIG. 2.

Figure 3:
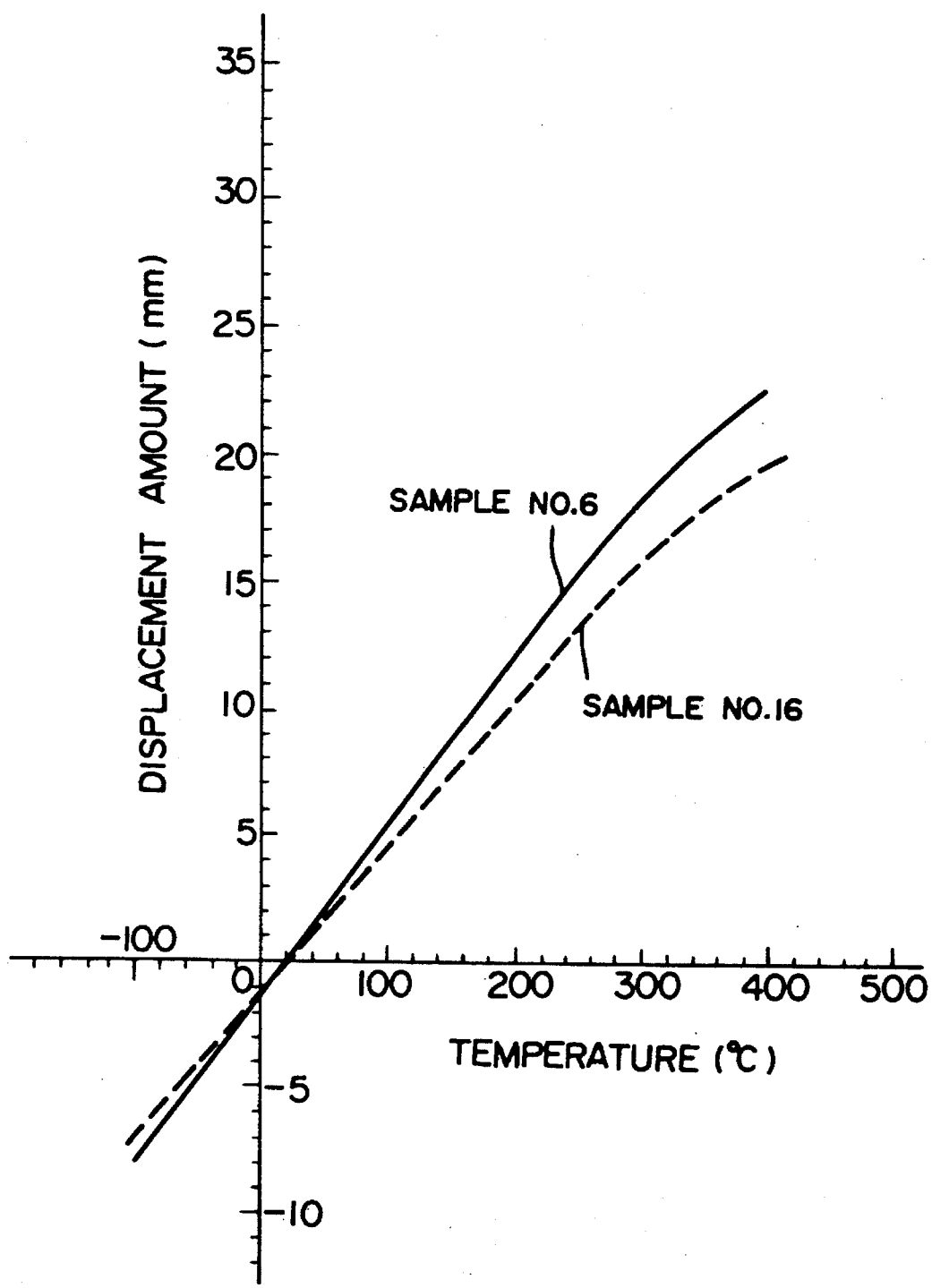
FIG. 3 is a graph showing the relationship between the temperature change and a displacement amount (bending amount) of a bimetal.

The relationship between the temperature change and displacement amount (bending amount) of a Sample No. 16 of the comparative example conventionally known as a bimetal configuration having a wide proportional temperature range, and those of a Sample No. 6 (the high thermal expansion alloy is the same material as the Sample No. 16) of the present invention is shown in FIG. 3.

TABLE 1

| sample No. | coating material | low thermal expansion alloy | intermediate layer | high thermal expansion alloy | coating material | JIS symbols (C 2530) |
|---|---|---|---|---|---|---|
| present invention | | | | | | |
| 1 | — | 32.08Ni-7.89Co—Fe | — | 9Ni-72Mn—Cu | — | |
| 2 | — | 32.1Ni-6.8Co—Fe | — | 23Ni-5Mn—Fe | — | |
| 3 | — | 33.16Ni-7.05Co—Fe | — | 23Ni-5Mn—Fe | — | |
| 4 | — | 32.08Ni-7.89Co—Fe | — | 23Ni-5Mn—Fe | — | |
| 5 | — | 32.08Ni-7.89Co—Fe | — | 22Ni-3.5Cr—Fe | — | |
| 6 | — | 32.08Ni-7.89Co—Fe | — | 20Ni-6Cr—Fe | — | |
| 7 | — | 32.08Ni-7.89Co—Fe | Cu | 9Ni-72Mn—Cu | — | |
| 8 | — | 32.08Ni-7.89Co—Fe | Ni—Cu | 9Ni-72Mn—Cu | — | |
| 9 | — | 32.08Ni-7.89Co—Fe | Zr—Cu | 20Ni-6Cr—Fe | — | |
| 10 | — | 32.08Ni-7.89Co—Fe | Ni | 23Ni-5Mn—Fe | — | |
| 11 | — | 32.08Ni-7.89Co—Fe | — | 9Ni-72Mn—Cu | 31Ni—Cu | |
| 12 | Al | 32.08Ni-7.89Co—Fe | — | 23Ni-5Mn—Fe | Al | |
| comparative example | | | | | | |
| 13 | — | 36Ni—Fe | — | 9Ni-72Mn—Cu | — | TM1-200-R110 |
| 14 | — | 36Ni—Fe | — | 23Ni-5iMn—Fe | — | TM2-150-R81 |
| 15 | — | 36Ni—Fe | — | 22Ni-3.5Cr—Fe | — | TM2-138-R78 |
| 16 | — | 42Ni—Fe | — | 20Ni-6Cr—Fe | — | TM4-115-R70 |
| 17 | — | 36Ni—Fe | Cu | 9Ni-72Mn—Cu | — | — |
| 18 | — | 36Ni—Fe | Ni—Cu | 9Ni-72Mn—Cu | — | — |
| 19 | — | 36Ni—Fe | Zr—Cu | 20Ni-6Cr—Fe | — | TM5B-138-R15 |
| 20 | — | 36Ni—Fe | Ni | 23Ni-5Mn—Fe | — | TM6-140-R33 |
| 21 | — | 36Ni—Fe | — | 9Ni-72Mn—Cu | 31Ni—Cu | |
| 22 | Al | 36Ni—Fe | — | 23Ni-5Mn—Fe | Al | |

TABLE 2

| sample No. | proportional temperature range (high sensitivity temperature range) °C. | bending coefficient (based on room temperature to 100° C.) × 10$^{-6}$/K | electrical resistivity (20° C.) μΩ · cm |
| --- | --- | --- | --- |
| present invention | | | |
| 1 | −20 ~ 220 | 22.0 | 110.0 |
| 2 | −20 ~ 290 | 15.8 | 81.0 |
| 3 | −20 ~ 330 | 15.0 | 81.0 |
| 4 | −20 ~ 320 | 15.7 | 81.0 |
| 5 | −20 ~ 320 | 14.3 | 78.0 |
| 6 | −20 ~ 350 | 13.6 | 78.0 |
| 7 | −20 ~ 220 | 20.7 | 8.1 |
| 8 | −20 ~ 220 | 21.0 | 26.5 |
| 9 | −20 ~ 320 | 14.3 | 15.5 |
| 10 | −20 ~ 320 | 14.6 | 32.2 |
| 11 | −20 ~ 220 | 19.3 | 105.0 |
| 12 | −20 ~ 320 | 15.4 | 43.0 |
| comparative example | | | |
| 13 | −20 ~ 150 | 20.0 | 110.0 |
| 14 | −20 ~ 150 | 15.0 | 81.0 |
| 15 | −20 ~ 150 | 13.8 | 78.0 |
| 16 | −20 ~ 350 | 11.5 | 70.0 |
| 17 | −20 ~ 150 | 19.6 | 8.6 |
| 18 | −20 ~ 150 | 19.6 | 27.5 |
| 19 | −20 ~ 150 | 13.8 | 15.0 |
| 20 | −20 ~ 150 | 14.0 | 33.0 |
| 21 | −20 ~ 150 | 17.5 | 105.0 |
| 22 | −20 ~ 150 | 14.8 | 43.0 |

It is known from Table 1 and Table 2 that, the proportional temperature range of the bimetal of the present invention is considerably wider than that of the conventional bimetal. It is also known that the bimetal of the present invention has a larger bending coefficient. (The high thermal expansion alloy is Samples No. 1 and No. 13, No. 4 and No. 14, No. 5 and No. 15, No. 6 and No. 16, No. 7 and No. 17, No. 8 and No. 18, No. 9 and No. 19, No. 10 and No. 20, No. 11 and No. 21, No. 12 and No. 22 are all same, thus the effect of the bimetal of the present invention can be compared).

Particularly, it is known from FIG. 2 that, the bimetal of the present invention is capable of obtaining a large displacement amount which can not be obtained by the conventional bimetal, and a stable and high precision thermal control in a very wide temperature range is possible, because that its linearity is not spoiled in the high temperature region.

Also, it is known from FIG. 3 that, the bimetal of the present invention has a same or wider proportional temperature range than the conventional bimetal, wherein a 42 wt % Ni—Fe alloy is arranged as the low thermal expansion alloy, and a large displacement amount.

As it is apparent from the above embodiments, the bimetal of the present invention has a same or wider proportional temperature range than the bimetal using the 42 wt % Ni—Fe alloy as the low thermal expansion alloy, and a high bending characteristic of a large bending coefficient than the bimetal using the 36 wt % Ni—Fe alloy. Particularly, a stable and high precision thermal control can be realized in thermal control devices and the like, and it is possible to achieve the small-sized, light and endurable devices, thus the bimetal can be used more widely.

What is claimed is:

1. A bimetal comprising a low thermal expansion alloy bonded to a high thermal expansion alloy, said low thermal expansion alloy consisting essentially of 32 to 34 wt % Ni, 6 to 8.5 wt % Co, wherein 38.5 ≦ Ni + Co ≦ 40 0.5 wt % and residual Fe, and having a transition point of at least 250° C. and a transition temperature of no more than −70° C.

2. A bimetal in accordance with claim 1, wherein said Co content is more than 7 and less than 8 wt %.

3. A bimetal in accordance with claim 1, wherein said low thermal expansion alloy contains up to 0.02 wt % C, up to 0.25 wt % Si and up 0.5 wt % Mn.

4. A bimetal in accordance with claim 1, including an intermediate metallic layer between said low thermal expansion alloy and said high thermal expansion alloy.

5. A bimetal in accordance with claim 4, wherein said intermediate metallic layer is composed of a single metal or metal alloy selected from the group consisting of Cu, Cu alloy and Ni.

6. A bimetal in accordance with claim 5, wherein said intermediate metallic layer comprises a Cu alloy containing 0.2 to 30 wt % Ni.

7. A bimetal in accordance with claim 1, including a clad surface foil of a single metal or metal alloy selected from the group consisting of Ni, Ni—Cu alloy, Fe—Cr alloy, and Ti.

8. A bimetal in accordance with claim 1, including a clad surface foil of a metal selected from the group consisting of Al and Zn.

9. A bimetal in accordance with claim 4, including a clad surface foil of a single metal or metal alloy selected from the group consisting of Ni, Ni—Cu alloy, Fe—Cr alloy, and Ti.

10. A bimetal in accordance with claim 4, including a clad surface foil of a metal selected from the group consisting of Al or Zn.

11. A bimetal in accordance with claim 1, wherein said high thermal expansion metal is selected from the group consisting of Ni and Cu.

12. A bimetal in accordance with claim 1, wherein said high thermal expansion alloy is a Zn—Cu alloy composed of 20 to 40 wt % Zn and residual Cu.

13. A bimetal in accordance with claim 1, wherein said high thermal expansion alloy is a Ni—Cr—Fe alloy composed of 17 to 26 wt % Ni, 2.5 to 12 wt % Cr, and residual Fe.

14. A bimetal in accordance with claim 1, wherein said high thermal expansion alloy is an Ni—Mn—Fe alloy composed of 17 to 26 wt % Ni, 5 to 7 wt % Mn and residual Fe.

15. A bimetal in accordance with claim 1, wherein said high thermal expansion alloy is an Ni—Mo—Fe alloy composed of 17 to 26 to wt % Ni, 3 to 7 wt % Mo and residual Fe.

16. A bimetal in accordance with claim 1, wherein said high thermal expansion alloy is a Cu—Ni—Mn alloy composed of 70 to 80 wt % Mn, 5 to 15 wt % Ni and residual Cu.

17. A bimetal according to claim 5, wherein said intermediate metallic layer comprises a Cu alloy containing 0.1 to 1 wt % Zr.

\* \* \* \* \*